Patented Oct. 22, 1940

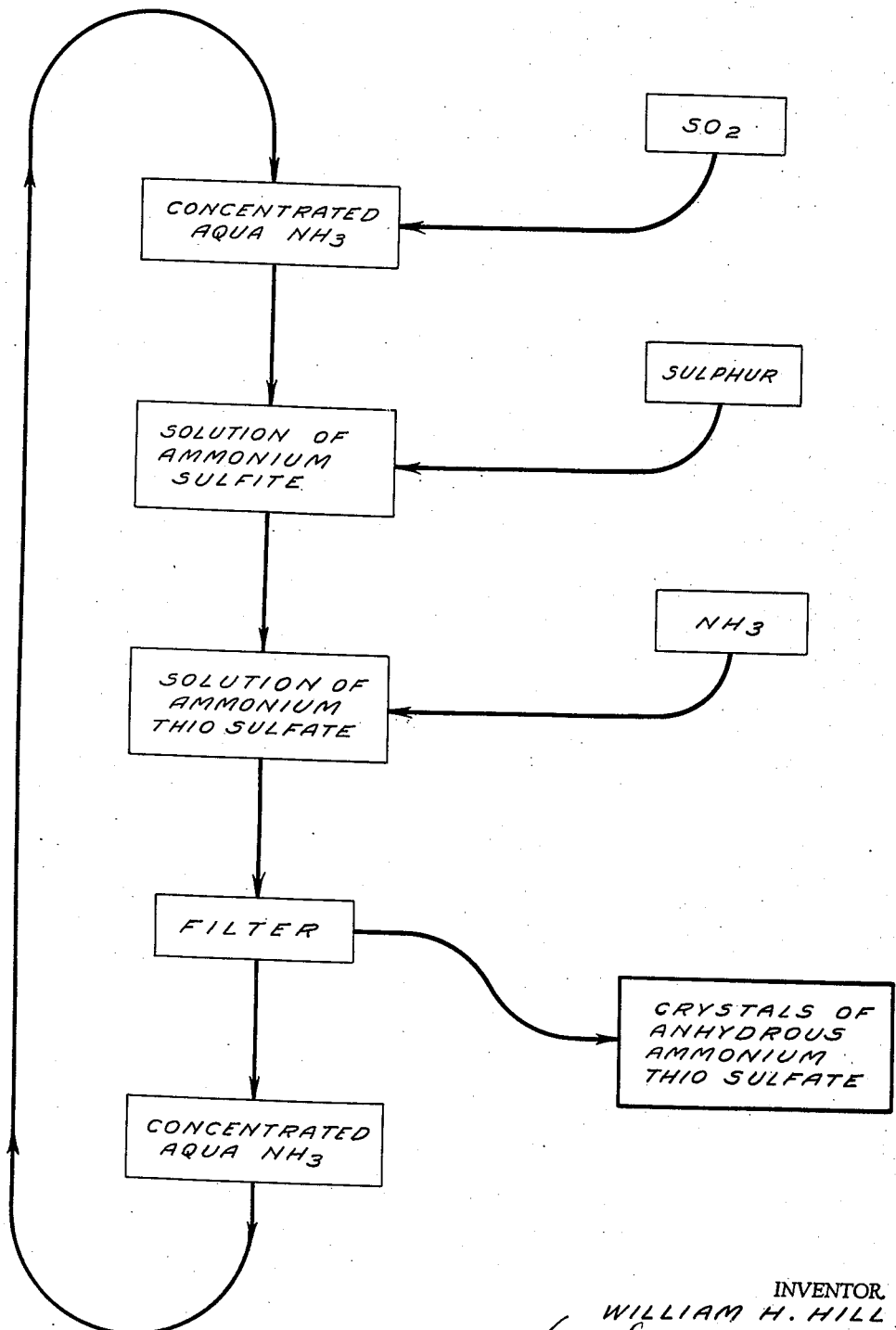
INVENTOR
WILLIAM H. HILL;
BY Ellis S. Middleton
ATTORNEY.

2,219,258

UNITED STATES PATENT OFFICE 2,219,258

SOLID AMMONIUM THIOSULPHATE

William H. Hill, Mount Lebanon, Pa., assignor to American Cyanamid Company, New York, N. Y., a corporation of Maine Application December 5, 1939, Serial No. 307,600

5 Claims. (Cl. 23—115)

The present invention relates to the production of solid ammonium thiosulphate from its aqueous solutions.

Ammonium thiosulphate, while reasonably stable as such, undergoes decomposition when heated to any great extent, such as when its recovery is attempted from aqueous solutions by removing water through evaporation. For this reason, it is difficult, if not impossible, to obtain ammonium thiosulphate in the pure state by heat evaporation from water solution. Under these circumstances, and in order to prevent this thermal decomposition, it becomes necessary to resort to vacuum concentration, which involves expensive apparatus and careful control.

The principal object of the present invention, therefore, resides in the recovery of solid ammonium thiosulphate from aqueous solutions thereof by methods not involving the use of heat at all, but, on the contrary, depends upon the principle of lowering the solubility of the salt in its solution by adding ammonia thereto.

Another object of the invention resides in the production of crystals of ammonium thiosulphate in anhydrous form in a good state of purity. This is a corollary of the object above mentioned in that by using a proper concentration of ammonia in the aqueous solution of ammonium thiosulphate, the salt may be forced to crystallize therefrom without water of crystallization. This is of advantage in that it reduces the total weight of the salt during shipment.

Another important object of the invention resides in the production of solid ammonium thiosulphate in a good state of purity without resorting to heat wherein a completely cyclic and continuous process results by reason of the fact that the final liquor from which the ammonium thiosulphate has been completely removed may be recycled as such to the start of the process for the synthesis of additional quantities of the salt. Some ammonia may be removed from the final liquor before recycling so as to have at the start of the process such a concentration of ammonia as will yield with sulphur dioxide and sulphur an amount of ammonium thiosulphate most desired in the process.

The invention further consists in the novel steps and combination of steps more fully hereinafter described and shown in the drawing, which constitutes a flow sheet of a preferred process.

Inasmuch as the principal object of the invention resides in the recovery of crystals of ammonium thiosulphate from aqueous solutions thereof without the aid of heat, this part of the process will first be described regardless of the source of the salt solution.

It has been discovered that if ammonia, either in the form of gas or a liquid, is added to an aqueous solution of ammonium thiosulphate in such a way that ammonia is dissolved therein, crystals of ammonium thiosulphate will be precipitated by reason of the fact that at a proper concentration, ammonium thiosulphate is completely insoluble in aqueous ammonia solution. Consequently, an aqueous solution of ammonium thiosulphate may be partially or completely stripped of the salt by adding ammonia thereto. This may be accomplished either at atmospheric pressures or pressures greater than atmospheric.

The fact that ammonium thiosulphate is very soluble in water solution and is completely insoluble in water containing appropriate quantities of dissolved ammonia makes it possible, through the appropriate adjustment of the ammonia content of the solution, to obtain very fine or very large crystals of the salt or perhaps what is more important, crystals of any size, but uniform in dimension.

For instance, assuming an aqueous solution of ammonium thiosulphate, the salt being less soluble in ammonia solution than in water, ammonia may be added until the salt will begin to be thrown out of solution by reason of the fact that the latter is supersaturated therewith. By continuing the ammonia addition, the solution may be completely freed of ammonium thiosulphate leaving behind only ammonia dissolved in water.

If, on the other hand, the ammonia is added to the ammonium thiosulphate solution slowly so as to substantially maintain the solution in the metastable zone, that is, where crystal growth can take place but where no new crystals result, large and uniformly sized crystals of ammonium thiosulphate may be obtained. This is based on the discovery that there is a range in concentration of ammonia in the salt solution at which time the solution is saturated with the salt. This is a metastable zone and in which crystals will not be precipitated. If the ammonia concentration is built up above this maximum, crystal nuclei will form because the solution has reached a state of supersaturation. If no more ammonia is added, crystal nuclei will continue to form until the solution drops back into the metastable zone or zone of saturation. At that point, no new crystals will form. While in this phase, however, ammonium thiosulphate can and will be thrown out of solution to build up upon the crystal nuclei formed, to produce crystal growth. This process will continue until the solution reaches the saturated phase at which time crystal growth will stop. If, therefore, the ammonia addition is continued at such a rate as not to exceed the rate of crystal growth, that is, to maintain the solution in a state of metastability, the crystals already formed will continue to grow to any desired size.

Where fine crystals are desired, ammonia may be added at a rate greater than that at which crystal growth may take place, that is, to maintain the concentration of ammonia in the solution such that the solution will always be in a state of supersaturation. Consequently, the ammonium thiosulphate may be completely removed from the solution, leaving only a concentrated solution of ammonia. This will produce very fine crystals.

Where crystals of various sizes are to be produced, it will be expedient to periodically increase the ammonia content of the solution to such an extent that supersaturation is reached for a while, whereby crystal nuclei are formed. If, then, the ammonia input is stopped, crystal growth will take place on the nuclei already formed. Additional quantities of ammonia sufficient to again enter the zone of supersaturation will cause an additional group of small nuclei. By repeating the process, when the solution again reaches the stage of saturation or metastability, crystal growth will take place not only upon the second crop of small crystals but upon those formed originally which have grown. In this way, any number of sizes of crystals may be obtained at will.

In the first instance, where crystals of desirably large size are to be produced, it will be noted that upon removal of these large crystals, the solution still contains ammonium thiosulphate. The liquor may be made barren of the salt by continued addition of ammonia until all of the ammonium thiosulphate has been thrown out.

Such a process produces the salt in crystal form in a very pure state by reason of the fact that no heat has been applied to the solution and, consequently, there is no chance for thermal decomposition. Moreover, under the above conditions, ammonium thiosulphate is obtained as anhydrous crystals.

Referring now to a complete process, reference is made to the flow sheet which indicates a preferred method of ammonium thiosulphate synthesis resulting in an aqueous solution of the salt from which the latter may be obtained from the ammonia method above described.

It is known that if sulphur dioxide is reacted with ammonia, the ammonium sulphite is formed. This may be done in the gas phase or in aqueous solution. In the latter case, depending upon the initial concentration of the ammonia in the aqueous solution, a solution of ammonium sulphite or a suspension thereof may result. On contacting such solution or suspension with sulphur, conversion to thiosulphate takes place. Although this conversion takes place at room temperature, it is usually carried out at temperatures of about 50° to 100° C., merely for the greater speed of reaction. I prefer a temperature of about 50° C. It is desirable to so regulate the initial ammonia concentration in the water that on conversion of the first formed ammonium sulphite to thiosulphate, a solution of about 30% of the latter results because it has been found by experience that when it is attempted to produce higher concentrations, the last amounts of ammonium sulphite are only very slowly converted and, therefore, the process becomes unduly sluggish.

The resulting ammonium thiosulphate solution may be ridded of its solids content by precipitation with ammonia, as above described. This may be done in several ways dependent upon what temperature was used in the conversion of ammonium sulphite to ammonium thiosulphate. If an elevated temperature was used, the ammonia can either be forced into it under pressure either as a gas or as a liquid, until a sufficiently high concentration is reached to precipitate it. On the other hand, the warm solution can be cooled down and ammonia then introduced whereby higher pressures can be dispensed with. The end effect is the same inasmuch as a certain ammonia concentration is needed regardless of temperature.

By ridding the solution of crystals of ammonium thiosulphate by the ammonia method above described, there remains at the end of the process an aqueous solution of ammonia. This liquor may then be returned to the start of the cycle for the formation of additional quantities of ammonium sulphite through introduction of sulphur dioxide, and the cycle repeated. The above cycle is particularly advantageous in that no substantial quantities of ammonia are lost nor is it necessary to deal with compressors or the like.

While the invention has been shown and described with particular reference to specific embodiments, it is to be understood that it is not to be limited thereto but is to be construed broadly and restricted solely by the scope of the appended claims.

I claim:

1. A method of recovering crystals of ammonium thiosulphate from aqueous solutions thereof which includes the step of introducing ammonia into the solution until crystals of ammonium thiosulphate are precipitated therefrom.

2. The method of claim 1 in which the ammonia is added at such a rate as to cause the solution to reach a state of supersaturation whereby crystals of the salt are precipitated and thereafter adjusting the rate of ammonia addition so that no new crystals are formed but so as to cause ammonium thiosulphate in solution to be thrown out and grow upon the crystal nuclei already formed.

3. The method of claim 1 in which the ammonia addition is continued until the solution is barren of ammonium thiosulphate.

4. A method of obtaining crystals of ammonium thiosulphate which comprises forming an aqueous solution of ammonium sulphite by adding sulphur dioxide to an aqueous solution of ammonia, adding sulphur thereto to form an aqueous solution of ammonium thiosulphate, adding ammonia to the ammonium thiosulphate solution until the solution is supersaturated with the ammonium thiosulphate, continuing the ammonia addition until the liquor is barren of thiosulphate, removing the latter and recycling the resultant concentrated aqueous solution of ammonia to the start of the cycle to react with additional quantities of sulphur dioxide to form ammonium sulphite.

5. A method of obtaining crystals of ammonium thiosulphate which comprises forming an aqueous solution of ammonium sulphite by adding sulphur dioxide to an aqueous solution of ammonia, adding sulphur thereto to form an aqueous solution of ammonium thiosulphate, adding ammonia to the ammonium thiosulphate solution until the solution is supersaturated with the ammonium thiosulphate, continuing the ammonia addition until the liquor is barren of thiosulphate, removing the latter and removing ammonia from the resultant aqueous solution thereof until the ammonia content of this solution is such as will produce a 30% solution of ammonium thiosulphate after reaction with appropriate quantities of sulphur dioxide and sulphur, and returning this aqueous solution of ammonia to the start of the cycle.

WILLIAM H. HILL.